(12) United States Patent
Palaskas et al.

(10) Patent No.: US 7,333,423 B2
(45) Date of Patent: Feb. 19, 2008

(54) TRANSCEIVER WITH CALIBRATED I AND Q PATHS AND METHODS FOR DECONVOLVED CALIBRATION

(75) Inventors: Georgios Palaskas, Portland, OR (US); Ashoke Ravi, Hillsboro, OR (US); Jeyanandh K. Paramesh, Hillsboro, OR (US); Richard B. Nicholls, Banks, OR (US); Krishnamurthy Soumyanath, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 668 days.

(21) Appl. No.: 10/815,138

(22) Filed: Mar. 31, 2004

(65) Prior Publication Data
US 2005/0220003 A1  Oct. 6, 2005

(51) Int. Cl.
*H04J 11/00* (2006.01)
*H04B 1/38* (2006.01)
*H04B 1/10* (2006.01)
*H04B 1/26* (2006.01)

(52) U.S. Cl. ............ 370/210; 375/219; 455/303; 455/323

(58) Field of Classification Search ........ 375/219; 370/210; 455/303, 323
See application file for complete search history.

(56) References Cited

U.S. PATENT DOCUMENTS

| | | | |
|---|---|---|---|
| 4,216,503 A * | 8/1980 | Wiggins | 358/446 |
| 6,009,317 A * | 12/1999 | Wynn | 455/296 |
| 6,255,986 B1 * | 7/2001 | Alberty et al. | 342/174 |
| 6,330,290 B1 * | 12/2001 | Glas | 375/324 |
| 6,339,399 B1 * | 1/2002 | Andersson et al. | 342/372 |
| 6,670,900 B1 * | 12/2003 | Zhang | 341/118 |
| 6,760,577 B2 * | 7/2004 | Li | 455/323 |
| 6,842,489 B2 * | 1/2005 | Masenten | 375/261 |
| 6,895,045 B2 * | 5/2005 | Ozluturk et al. | 375/235 |
| 7,020,220 B2 * | 3/2006 | Hansen | 375/324 |
| 7,061,994 B2 * | 6/2006 | Li et al. | 375/316 |
| 7,187,916 B2 * | 3/2007 | Mo et al. | 455/323 |
| 2002/0097812 A1 * | 7/2002 | Wiss | 375/316 |
| 2003/0003891 A1 * | 1/2003 | Kivekas et al. | 455/313 |
| 2003/0179766 A1 * | 9/2003 | Azadet | 370/436 |
| 2003/0206603 A1 * | 11/2003 | Husted | 375/324 |
| 2003/0223480 A1 * | 12/2003 | Cafarella | 375/219 |
| 2003/0227989 A1 * | 12/2003 | Rhee et al. | 375/376 |
| 2005/0041754 A1 * | 2/2005 | Wu et al. | 375/295 |
| 2005/0047536 A1 * | 3/2005 | Wu et al. | 375/346 |
| 2005/0107059 A1 * | 5/2005 | Lehning et al. | 455/303 |
| 2005/0148304 A1 * | 7/2005 | Jerng | 455/75 |

OTHER PUBLICATIONS

Cavers, J. K., "New Methods for Adaptation of Quadrature Modulators and Demodulators in Amplifier Linearization Circuits", *IEEE Transactions on Vehicular Technology*, 46(3), (Aug. 1997), 707-716.

\* cited by examiner

*Primary Examiner*—Mohammed Ghayour
*Assistant Examiner*—Nurul M Matin
(74) *Attorney, Agent, or Firm*—Schwegman, Lundberg & Woessner, P.A.

(57) ABSTRACT

Phase and amplitude offsets of a multicarrier transceiver may be reduced by measuring receiver amplitude and phase mismatches of receiver radio-frequency (RF) circuitry by performing a fast Fourier transform (FFT) on a receiver calibration signal.

30 Claims, 5 Drawing Sheets

MULTICARRIER TRANSCEIVER

FIG. 1

MULTICARRIER TRANSCEIVER

TRANSMITTER CIRCUITRY

FIG. 2

RECEIVER CIRCUITRY

FIG. 3

TIME-DOMAIN CORRECTION

TRANSCEIVER WITH CALIBRATED I AND Q PATHS AND METHODS FOR DECONVOLVED CALIBRATION

TECHNICAL FIELD

Embodiments of the present invention pertain to wireless communications, and in some embodiments, to multicarrier communications.

BACKGROUND

Transmitter radio-frequency (RF) circuitry and receiver RF circuitry of a transceiver utilize in-phase (I) channel and quadrature-phase (Q) channel paths to generate RF signals for transmission as well as to process received RF signals. Mismatches between the I-channel and Q-channel paths in the transmitter RF circuitry deteriorate the quality of the transmitted signals, while mismatches between the I-channel and Q-channel paths in the receiver RF circuitry reduce receiver performance.

In the case of transceivers that communicate multicarrier signals, such as orthogonal frequency division multiplexed (OFDM) signals, mismatches between the I-channel and Q-channel paths may result in cross talk between individual subcarriers of the multicarrier signals. In the case of the transmitted signals, cross talk may deteriorate the error-vector magnitude (EVM), while in the case of the received signals, cross talk may increase the received packet error rate (PER), among other things.

Thus there are general needs for multicarrier transceivers that may offset at least some of the mismatch between the I-channel and Q-channel paths.

BRIEF DESCRIPTION OF THE DRAWINGS

The appended claims are directed to some of the various embodiments of the present invention. However, the detailed description presents a more complete understanding of embodiments of the present invention when considered in connection with the figures, wherein like reference numbers refer to similar items throughout the figures and:

DETAILED DESCRIPTION

The following description and the drawings illustrate specific embodiments of the invention sufficiently to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. The scope of embodiments of the invention encompasses the full ambit of the claims and all available equivalents of those claims. Such embodiments of the invention may be referred to, individually or collectively, herein by the term "invention" merely for convenience and without intending to voluntarily limit the scope of this application to any single invention or inventive concept if more than one is in fact disclosed.

Figure 1:
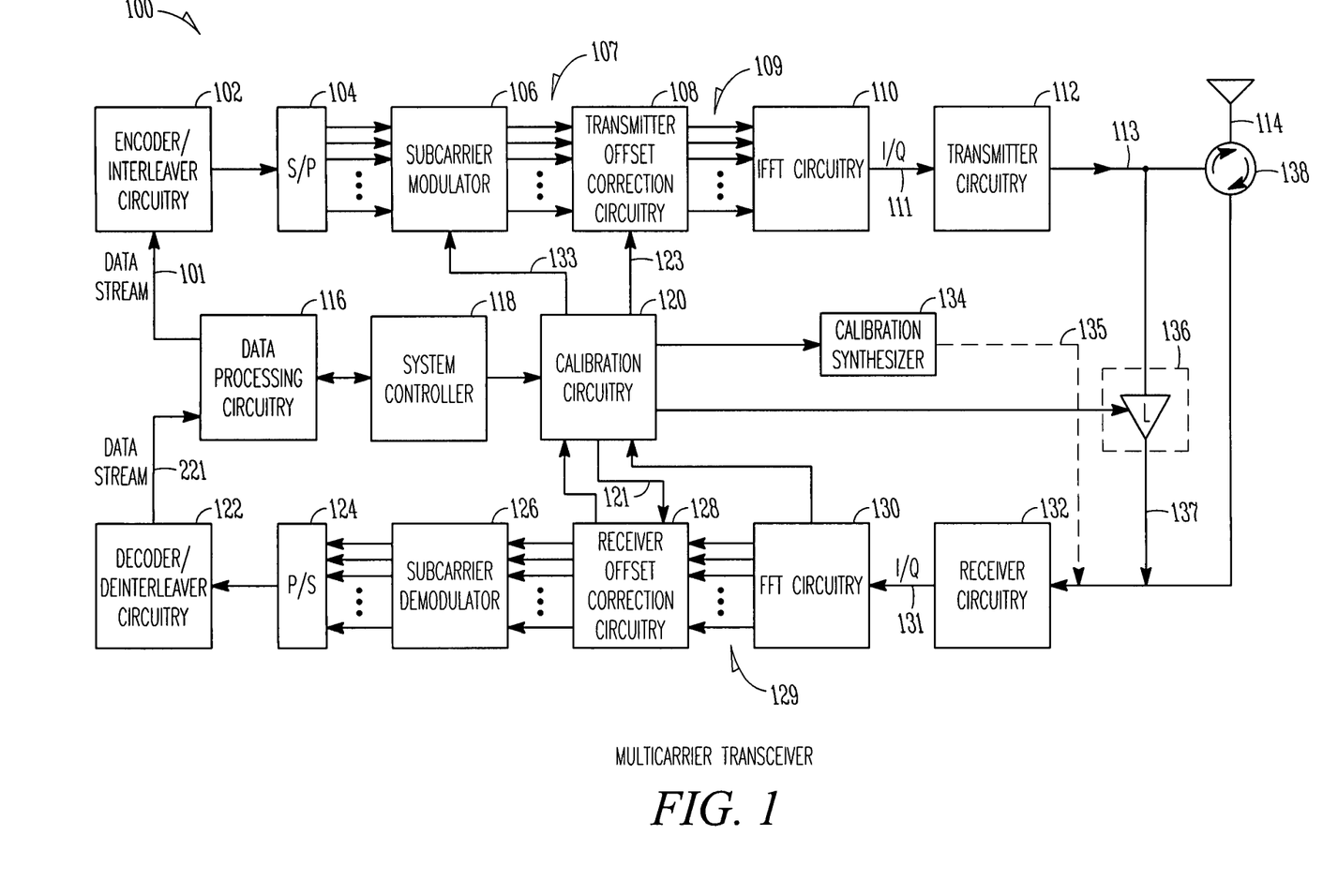
FIG. 1 is a block diagram of a transceiver in accordance with some embodiments of the present invention.

FIG. 1 is a block diagram of a transceiver in accordance with some embodiments of the present invention. Transceiver 100 may be part of a wireless communication device, and in some embodiments, transceiver 100 may transmit and/or receive multicarrier communication signals, such as orthogonal frequency division multiplexed (e.g., OFDM) communication signals, although the scope of the invention is not limited in this respect. In accordance with some embodiments, an amount of pre-distortion and post distortion may be determined to compensate for in-phase (I) channel and quadrature phase (Q) channel mismatches in the RF circuitry of transceiver 100.

In some embodiments, compensation for phase and amplitude mismatches of transmitter RF circuitry 112 may be performed by a frequency-domain pre-distortion of the transmit signals prior to an inverse fast Fourier transform (WFFT) by IFFT circuitry 110. In some embodiments, compensation for phase and amplitude mismatches of receiver RF circuitry 132 may be performed by a frequency-domain post-distortion of the received signals after a fast Fourier transform (FFT) by FFT circuitry 130, although the scope of the invention is not limited in this respect. In these embodiments which use frequency-domain pre-distortion of the transmit signals and frequency-domain post distortion of the receive signals, FFT circuitry 130 may be used to both estimate and correct, at least in part, any I-channel and Q-channel mismatches in transmitter RF circuitry 112 and receiver RF circuitry 132.

In some embodiments, compensation for phase and amplitude mismatches of transmitter RF circuitry 112 may be performed by a time-domain pre-distortion of the transmit signals after an IFFT by IFFT circuitry 110. In some embodiments, compensation for phase and amplitude mismatches of receiver RF circuitry 132 may be performed by a time-domain post-distortion of the received signals prior to an FFT by FFT circuitry 130, although the scope of the invention is not limited in this respect. In these embodiments which use time-domain pre-distortion of the transmit signals and time-domain post distortion of the receive signals, FFT circuitry 130 may be used to estimate any I-channel and Q-channel mismatches in transmitter RF circuitry 112 and receiver RF circuitry 132.

Some embodiments of the present invention take advantage of FFT circuitry 130 of a multicarrier receiver to determine an amount of pre-distortion for any I-channel and Q-channel mismatches in transmitter RF circuitry 112 and to determine an amount of post distortion for any I-channel and Q-channel mismatches in receiver RF circuitry 132. Although the terms "phase" and "amplitude" are used herein to describe components of one or more signals, these terms may be used interchangeably with the terms in-phase (I) channel and quadrature phase (Q) channel to describe components of one or more signals.

In some embodiments, transceiver 100 may perform a calibration that involves first calibrating receiver RF circuitry 132 using receiver calibration signal 135, and secondly calibrating transmitter RF circuitry 112 with a transmitter calibration signal while applying receiver amplitude and phase offsets 121 determined during the calibration of receiver RF circuitry 132. In other embodiments, transceiver 100 may perform a calibration that involves calibrating receiver RF circuitry 132 and transmitter RF circuitry 112 together by applying a single transmitter-receiver calibration signal. These embodiments are discussed in more detail discussed below.

In some embodiments, transceiver 100 may include calibration circuitry 120 to measure receiver amplitude and phase mismatches of receiver RF circuitry 132 by performing an FFT on signals 131 that result from the application of receiver calibration signal 135 at the input of receiver RF circuitry 132. Transceiver 100 may also include receiver frequency-domain offset correction circuitry 128 to apply frequency-domain receiver amplitude and phase offsets 121 to substantially offset any I-channel and Q-channel mismatches of receiver RF circuitry 132. Frequency-domain receiver amplitude and phase offsets 121 may be generated by calibration circuitry 120 based on the measured receiver mismatches at FFT circuitry 130 resulting from the application of receiver calibration signal 135 at the input of receiver RF circuitry 132.

In some embodiments, transceiver 100 may also include calibration synthesizer 134 to generate receiver calibration signal 135. In some embodiments, calibration circuitry 120 may apply transmitter calibration control signal 133 to subcarrier modulator 106 to cause subcarrier modulator 106 to responsively generate a calibration output signal for transmitter RF circuitry 112. Calibration circuitry 120 may also determine transmitter amplitude and phase mismatches of transmitter RF circuitry 112 by performing an FFT on signals 131 that result from the application of transmitter calibration control signal 133 to subcarrier modulator 106. During this determination of the transmitter amplitude and phase mismatches of transmitter RF circuitry 112, output signal 113 of transmitter RF circuitry 112 may be coupled to an input of receiver RF circuitry 132 by a switching element (not illustrated). Frequency-domain receiver amplitude and phase offsets 121 may be applied during the determination of the transmitter amplitude and phase mismatches to offset any mismatches previously determined in receiver RF circuitry 132 and to isolate the effects of transmitter RF circuitry 112. Transmitter frequency-domain offset correction circuitry 108 may apply frequency-domain amplitude and phase offsets 123 determined from the transmitter amplitude and phase mismatches of transmitter RF circuitry 112 to pre-distort I-channel and Q-channel signals 111.

In some multicarrier embodiments, including in some OFDM embodiments, the operation of the transmitter portion of transceiver 100 may be described as follows. Data for transmission may be generated by data processing circuitry 116 in the form of data stream 101. Encoder and interleaver circuitry 102 may perform forward error correction (FEC) encoding as well as interleaving on data stream 101. Serial to parallel converter 104 may convert the data stream from a serial form to a parallel form generating parallel groups of bits. Subcarrier modulator 106 may modulate the parallel groups of bits to generate symbol-modulate subcarriers 107.

Subcarrier modulator 106 may modulate the parallel groups of bits in accordance with one or more modulation levels. Modulation levels may include binary phase shift keying (BPSK), which communicates one bit per symbol, quadrature phase shift keying (QPSK), which communicates two bits per symbol, BPSK, which communicates three bits per symbol, 16-quadrature amplitude modulation (16-QAM), which communicates four bits per symbol, 32-QAM, which communicates five bits per symbol, 64-QAM, which communicates six bits per symbol, 128-QAM, which communicates seven bits per symbol, and 256-QAM, which communicates eight bits per symbol. Modulation levels with higher data communication rates per subcarrier may also be used.

In some embodiments, the number of symbol-modulated subcarriers 107 may correspond to the number of carriers of a multicarrier signal. In some embodiments, the number of symbol-modulated subcarriers 107 may correspond to the number of subcarriers of an OFDM channel or subchannel. Symbol-modulated subcarriers 107 may be frequency-domain representations an OFDM symbol for transmission.

In some multicarrier embodiments that apply frequency-domain pre-distortion of the transmit signals, transmitter frequency-domain offset correction circuitry 108 may apply frequency-domain amplitude and phase offsets 123 to symbol-modulated subcarriers 107 to at least in part compensate for any amplitude and phase mismatches of transmitter RF circuitry 112. In some embodiments, transmitter offset correction circuitry 108 may be part of IFFT circuitry 110, although the scope of the invention is not limited in this respect.

In some embodiments that apply frequency-domain pre-distortion of the transmit signals, transmitter frequency-domain offset correction circuitry 108 may apply separate amplitude and phase offsets to each of symbol-modulated subcarriers 107 to at least in part compensate for any frequency dependent mismatches of transmitter RF circuitry 112, although the scope of the invention is not limited in this respect. In these embodiments, individual amplitude and phase offsets may be applied to each subcarrier or to groups of subcarriers.

IFFT circuitry 110 may perform an IFFT on the frequency-domain representation of symbol modulated subcarriers 109 to generate time-domain samples comprising an I-channel component and a Q-channel component for transmitter RF circuitry 112. Transmitter RF circuitry 112 generates RF signals for transmission by antenna 114 based on the I-channel and Q-channel components of signals 111 provided by IFFT circuitry 110.

In some multicarrier embodiments that apply time-domain pre-distortion to the transmit signals, transceiver 100 may include transmitter time-domain offset correction circuitry in the signal path after IFFT circuitry 110 instead of transmitter frequency-domain offset correction circuitry 108 in the signal path before IFFT circuitry 110. In these embodiments, the transmitter time-domain offset correction circuitry may apply time-domain amplitude and phase offsets to I-channel and Q-channel signals 111 to at least in part compensate for any amplitude and phase mismatches of transmitter RF circuitry 112, although the scope of the invention is not limited in this respect. Time-domain pre-distortion in accordance with some embodiments of the present invention is described in more detail below with reference to FIG. 4.

In some multicarrier embodiments, including some OFDM embodiments, the operation of the receiver portion of transceiver 100 may be described as follows. Receiver RF circuitry 132 receives RF signals from antenna 114 and generates I-channel and Q-channel time-domain signals 131, which may be in a serial stream. Signals 131 may be converted to a parallel form and FFT circuitry 130 may perform an FFT on the parallel signals to generate frequency-domain symbol-modulated subcarriers 129. The number of subcarriers may correspond to the carriers of a multicarrier signal. In some embodiments, the number of subcarriers may correspond to the number of subcarriers of an OFDM channel or subchannel. Receiver frequency-domain offset correction circuitry 128 may apply frequency-domain receiver amplitude and phase offsets 121 to frequency-domain symbol modulated subcarriers 129 to post distort the signals. Subcarrier demodulator 126 may demodulate and/or demap the corrected frequency-domain symbol modulated subcarriers, which may comprise parallel groups of symbols. Subcarrier demodulator 126 may generate parallel groups of bits based on one or more modulation levels. Parallel-to-serial converter 124 may convert the parallel groups of bits to a serial stream for deinterleaving and decoding by decoder and deinterleaver circuitry 122, which may provide decoded data stream 221 to data processing circuitry 116.

In some multicarrier embodiments that apply time-domain post distortion to the received signals, transceiver 100 may include receiver time-domain offset correction circuitry in the signal path before FFT circuitry 130 instead of receiver frequency-domain offset correction circuitry 128 in the signal path after FFT circuitry 130. In these embodiments, the receiver time-domain offset correction circuitry may apply time-domain amplitude and phase offsets to I-channel and Q-channel signals 131 to at least in part compensate for any amplitude and phase mismatches of receiver RF circuitry 132, although the scope of the invention is not limited in this respect.

In some embodiments, transceiver 100 may also include system controller 118. System controller 118 may coordinate the overall operation of transceiver 100. Other configurations of multicarrier transceivers other than those illustrated in FIG. 1 are also within the scope of the present invention.

In some embodiments, transceiver 100 may communicate over a channel having a bandwidth of approximately 20 MHz, although the scope of the invention is not limited in this respect. In some embodiments, transceiver 100 may communicate over a wider band or wideband communication channel. The wideband channel may comprise one or more multicarrier channels. The channels, sometimes referred to as subchannels, may be frequency-division multiplexed (i.e., separated in frequency) and may be within a predetermined frequency spectrum. In some of these multicarrier embodiments, the channels may comprise a plurality of orthogonal subcarriers. In some embodiments, the orthogonal subcarriers of a channel may be closely spaced OFDM subcarriers. To achieve orthogonality between closely spaced subcarriers, in these embodiments, the subcarriers of a particular channel may have a null at substantially a center frequency of the other subcarriers of that channel, although the scope of the invention is not limited in this respect.

In some embodiments, the frequency spectrums for channels and/or a wideband channel may comprise either a 5 GHz frequency spectrum or a 2.4 GHz frequency spectrum, although the scope of the invention is not limited in this respect. In these embodiments, the 5 GHz frequency spectrum may include frequencies ranging from approximately 4.9 to 5.9 GHz, and the 2.4 GHz spectrum may include frequencies ranging from approximately 2.3 to 2.5 GHz, although the scope of the invention is not limited in this respect, as other frequency spectrums are also equally suitable.

In some embodiments, transceiver 100 may be part of a personal digital assistant (PDA), a laptop or portable computer with wireless communication capability, a web tablet, a wireless telephone, a wireless headset, a pager, an instant messaging device, a digital camera, an access point or other device that may receive and/or transmit information wirelessly. In some embodiments, transceiver 100 may transmit and/or receive RF communications in accordance with specific communication standards, such as the Institute of Electrical and Electronics Engineers (IEEE) standards including IEEE 802.11 (a), 802.11 (b), 802.11 (g/h) and/or 802.11 (n) standards for wireless local area networks (WLANs) and/or 802.16 standards for wireless metropolitan area networks (WMANs), although transceiver 100 may also be suitable to transmit and/or receive communications in accordance with other techniques including the Digital Video Broadcasting Terrestrial (DVB-T) broadcasting standard, and the High performance radio Local Area Network (HiperLAN) standard.

Although some embodiments of the present invention are discussed in the context of an 802.11x implementation (e.g., 802.11a, 802.11g, 802.11 HT, etc.), the scope of the present invention is not limited in this respect. Some embodiments of the present invention may be implemented as part of any wireless system using multicarrier wireless communication channels (e.g., orthogonal frequency-division multiplexing (OFDM), discrete multi-tone modulation (DMT), etc.), such as may be used within, without limitation, a wireless personal area network (WPAN), a wireless local area network (WLAN), a wireless metropolitan are network (WMAN), a wireless wide area network (WWAN), a cellular network, a third generation (3G) network, a fourth generation (4G) network, a universal mobile telephone system (UMTS), and the like communication systems.

In some embodiments, antenna 114 may comprise one or more of a directional or omnidirectional antenna, including, for example, a dipole antenna, a monopole antenna, a loop antenna, a microstrip antenna or other type of antenna suitable for reception and/or transmission of RF signals within the spectrum utilized by transceiver 100. In some embodiments, the transmitter portion and the receiver portion of transceiver 100 may have separate transmit and receiver antennas. In some embodiments, when the transmitter portion and the receiver portion of transceiver 100 share one or more antennas, such as antenna 114, transceiver 100 may include transmit-receive separation circuitry 138 to separate and/or isolate the transmit signals from the received signals, although the scope of the invention is not limited in this respect. In some embodiments, a switching element may be used to couple the output of transmitter RF circuitry 112 to the input of receiver RF circuitry 132 during the calibration of transmitter RF circuitry 112. The switching element may be part of transmit-receive separation circuitry 138, although the scope of the invention is not limited in this respect.

Although transceiver 100 is illustrated as having several separate functional elements, one or more of the functional elements may be combined and may be implemented by combinations of software-configured elements, such as processing elements including digital signal processors (DSPs), and/or other hardware elements. For example, some of the elements illustrated may comprise one or more microprocessors, DSPs, application specific integrated circuits (ASICs), and combinations of various hardware and logic circuitry for performing at least the functions described herein.

In some embodiments, transmitter frequency-domain offset correction circuitry 108, IFFT circuitry 110, receiver frequency-domain offset correction circuitry 128, FFT circuitry 130, and calibration circuitry 120 may operate as part of one or more DSPs. In some embodiments, encoder and interleaver circuitry 102, serial-to-parallel converter 104, subcarrier modulator 106, data processing circuitry 116, system controller 118, decoder and interleaver circuitry 122, parallel-to-serial converter 124 and subcarrier modulator 126 may also be part of the one or more DSPs, although the scope of the invention is not limited in this respect.

In some embodiments, transceiver 100 may include limiter 136. Limiter 136 may be included in some embodiments in which transmitter RF circuitry 112 and receiver RF circuitry 132 are calibrated together. In some embodiments, transceiver 100 may include a voltage controlled oscillator (VCO) in place of limited 136 for use in calibration. These embodiments are discussed in more detail below.

Although transceiver 100 is illustrated with transmitter and receiver circuitry that share circuitry for calibration, the scope of the invention is not limited in this respect. Embodiments of the present invention include transmitters with their own calibration circuitry as well as receivers with their own calibration circuitry. In these embodiments, the transmitter and receiver may be calibrated separately.

Figure 2:
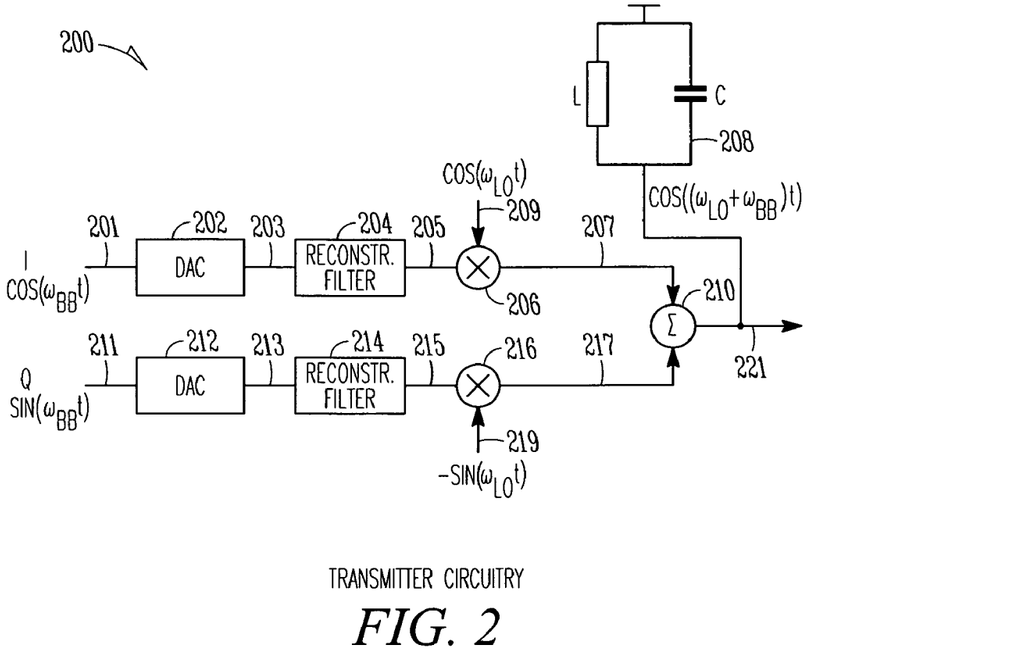
FIG. 2 is a block diagram of transmitter RF circuitry in accordance with some embodiments of the present invention.

FIG. 2 is a block diagram of transmitter RF circuitry in accordance with some embodiments of the present invention. Transmitter RF circuitry 200 may be suitable for use as transmitter RF circuitry 112 (FIG. 1), although other circuitry may also be suitable.

Transmitter RF circuitry 200 includes I-channel digital-to-analog converter (DAC) 202 to receive I-channel time-domain samples 201 provided by IFFT circuitry, such as IFFT circuitry 110 (FIG. 1), and to generate I-channel analog signals 203 from I-channel time-domain samples 201. Transmitter RF circuitry 200 may also include I-channel reconstruction filter 204 to generate baseband signals 205 by accumulating signal inputs from I-channel DAC 202. Transmitter RF circuitry 200 may also include I-channel mixer 206 to combine baseband signals 205 with local oscillator (LO) signals 209 to generate I-channel radio-frequency (RF) output signals 207.

Transmitter RF circuitry 200 also includes Q-channel digital-to-analog converter (DAC) 212 to receive Q-channel time-domain samples 211 provided by IFFT circuitry, such as IFFT circuitry 110 (FIG. 1), and to generate Q-channel analog signals 213 from Q-channel time-domain samples 211. Transmitter RF circuitry 200 may also include Q-channel reconstruction filter 214 to generate baseband signals 215 by accumulating signal inputs from Q-channel DAC 212. Transmitter RF circuitry 200 may also include Q-channel mixer 216 to combine baseband signals 215 with LO signals 219 to generate Q-channel RF output signals 217. I-channel RF output signals 207 and Q-channel RF output signals 217 may be combined in signal summer 210 to generate RF output signals 221 for transmission by one or more antennas, such as antenna 114 (FIG. 1). In some embodiments, I-channel time-domain samples 201 and Q-channel time-domain samples 211 may correspond to time-domain samples 111 (FIG. 1).

Amplitude and phase mismatches between the I-channel and Q-channel paths of transmitter RF circuitry 200 may result from mixers 206 and 216 and/or reconstruction filters 204 and 214. Phase mismatches between the I-channel and Q-channel paths may also result from mismatch between LO signals 209 and 219. The LO signal mismatches may result from an LO signal generator and a phase shifter and/or the voltage controlled oscillator (VCO) used to generate LO signals 209 and 219. In some embodiments, the mismatches resulting from reconstruction filters 204 and 214 may be frequency dependent.

In some embodiments, transmitter RF circuitry 200 may also include tank circuitry 208 to filter RF output signals 221. In some embodiments, tank circuitry 208 may also be reused to filter a receiver calibration signal. This is discussed in more detail below.

Figure 3:
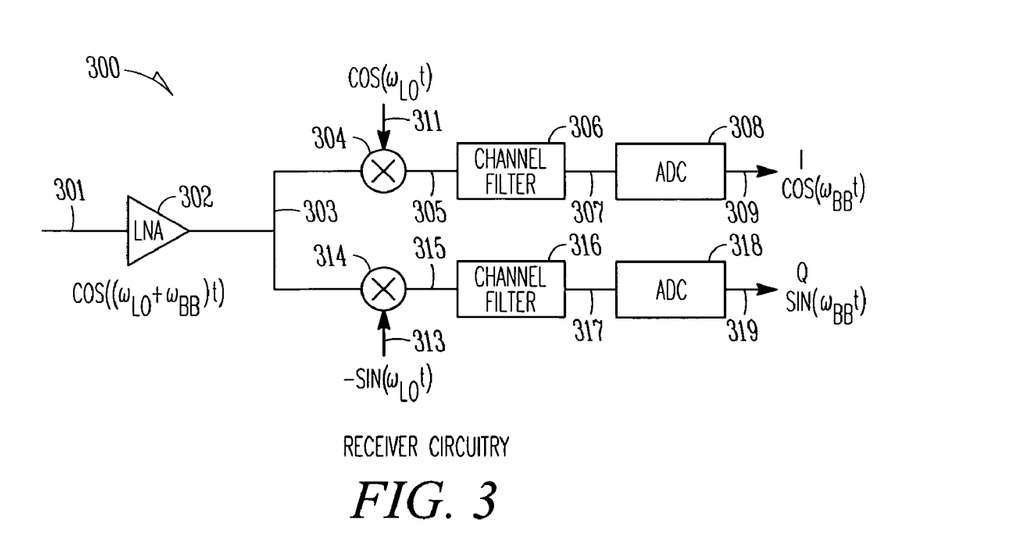
FIG. 3 is a block diagram of receiver RF circuitry in accordance with some embodiments of the present invention.

FIG. 3 is a block diagram of receiver RF circuitry in accordance with some embodiments of the present invention. Receiver RF circuitry 300 may be suitable for use as receiver RF circuitry 132 (FIG. 1), although other circuitry may also be suitable.

Receiver RF circuitry 300 may include low-noise amplifier (LNA) 302 to amplify RF signals 301. Receiver RF circuitry 300 may also include I-channel mixer 304 to combine RF signals 303 with LO signals 311 to generate I-channel baseband signals 305. Receiver RF circuitry 300 may also include I-channel channel filter 306 to select and/or filter I-channel baseband signals 305 and generate I-channel analog signals 307. Receiver RF circuitry 300 may also include I-channel analog-to-digital converter (ADC) 308 to convert I-channel analog signals 307 to I-channel time-domain samples 309.

Receiver RF circuitry 300 may also include Q-channel mixer 314 to combine RF signals 303 with LO signals 313 to generate Q-channel baseband signals 315. Receiver RF circuitry 300 may also include Q-channel channel filter 316 to select and/or filter Q-channel baseband signals 315 and generate Q-channel analog signals 317. Receiver RF circuitry 300 may also include Q-channel analog-to-digital converter (ADC) 318 to convert Q-channel analog signals 317 to Q-channel time-domain samples 319.

I-channel time-domain samples 309 and Q-channel time-domain samples 319 may correspond to time-domain samples 131 (FIG. 1) and may be provided to FFT circuitry, such as FFT circuitry 130 (FIG. 1) for performing an FFT thereon.

Amplitude and phase mismatches between the I-channel and Q-channel paths of receiver RF circuitry 300 may result from mixers 304 and 314 and/or channel filters 306 and 316. Phase mismatches between the I-channel and Q-channel paths may also result from mismatch between LO signals 311 and 313. The LO signal mismatches may result from an LO signal generator and a phase shifter and/or a VCO used to generate LO signals 311 and 313. In some cases, the mismatches resulting from channel filters 306 and 316 may be frequency dependent.

In some embodiments, filters 204 (FIG. 2), 214 (FIG. 2), 306 and 316 may be independently tuned to help eliminate the frequency dependence of the I-channel and Q-channel mismatch. In these embodiments, some of the techniques discussed herein may be used to calibrate out any residual frequency independent mismatch.

Figure 4:
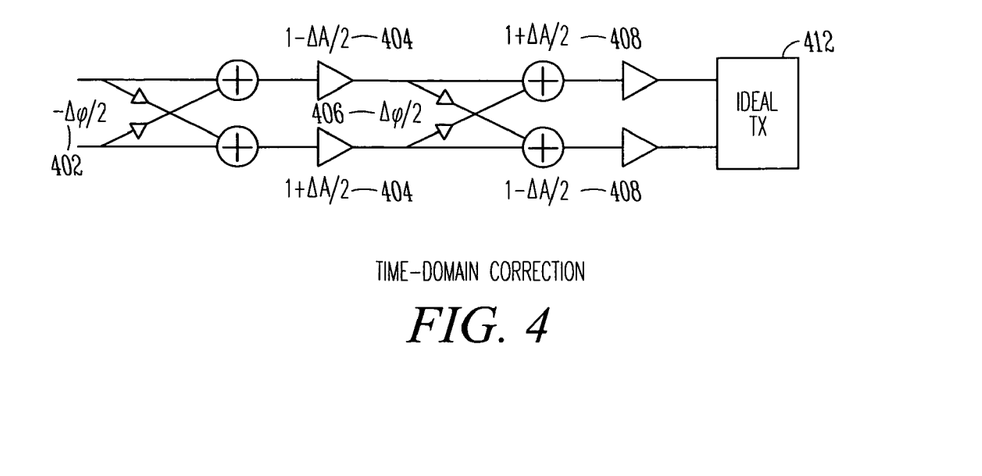
FIG. 4 illustrates time-domain correction of transmitter amplitude and phase mismatches in accordance with some embodiments of the present invention.

FIG. 4 illustrates time-domain correction of transmitter amplitude and phase mismatches in accordance with some embodiments of the present invention. Time-domain phase and amplitude corrections 402 and 404 may be generated by transmitter time-domain offset correction circuitry to at least in part offset transmitter amplitude and phase mismatches 406 and 408 of transmitter RF circuitry 112 (FIG. 1). Transmitter amplitude and phase mismatches 406 and 408 may represent equivalent mismatches resulting, for example, from mixers 206 (FIG. 2) and 216 (FIG. 2), filters 204 (FIG. 2) and 214 (FIG. 2) and quadrature LO signals 209 (FIG. 2) and 219 (FIG. 2). Transmitter RF circuitry 412 may represent ideal transmitter RF circuitry (i.e., without phase and amplitude offsets). In some embodiments, time-domain phase and amplitude corrections 402 and 404 may be applied in a signal path after IFFT circuitry 110 (FIG. 1). Receiver time-domain offset correction circuitry may similarly apply time-domain phase and amplitude corrections in the signal path before FFT circuitry 130 (FIG. 1) to compensate for mismatches resulting, for example, from mixers 304 (FIG. 3) and 314 (FIG. 3), channel filters 306 (FIG. 3) and 316 (FIG. 3) and quadrature LO signals 311 (FIG. 3) and 313 (FIG. 3).

In some embodiments that apply pre-distortion and post distortion in the frequency-domain, transmitter frequency-domain offset correction circuitry 108 (FIG. 1) may apply frequency-domain phase and amplitude corrections which may be equivalent to time-domain phase and amplitude corrections 402 and 404, although the scope of the present invention is not limited in this respect. Receiver frequency-domain offset correction circuitry 128 (FIG. 1) may similarly apply frequency-domain phase and amplitude corrections to compensate for mismatches in receiver RF circuitry.

Figure 5:
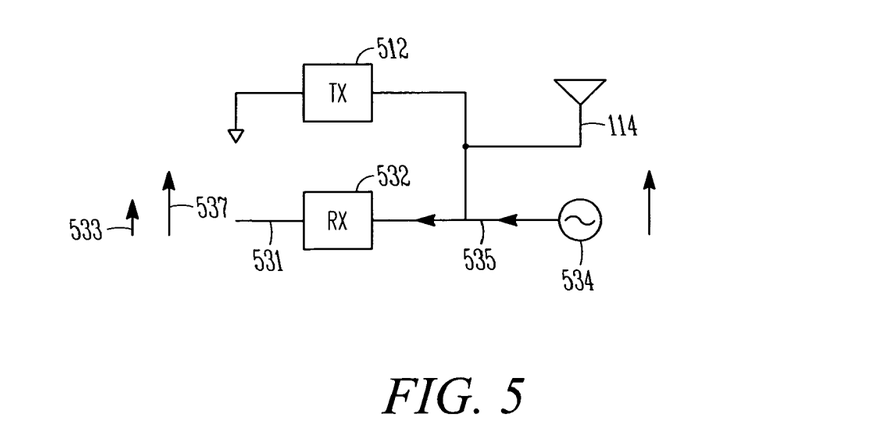
FIG. 5 illustrates calibration of receiver RF circuitry in accordance with some other embodiments of the present invention.

FIG. 5 illustrates calibration of receiver RF circuitry in accordance with some other embodiments of the present invention. In some embodiments, transmitter RF circuitry 512 may correspond to transmitter RF circuitry 112 (FIG. 1), and receiver RF circuitry 532 may correspond to receiver RF circuitry 132 (FIG. 1). As part of a calibration procedure, receiver calibration signal 535 may be applied to an input of receiver RF circuitry 532. After operations by receiver RF circuitry 532, output signals 531 may include image component 533 as well as main component 537. Image component 533 may result substantially from phase and amplitude mismatches in receiver RF circuitry 532. Calibration circuitry 120 (FIG. 1) may generate receiver amplitude and phase offsets based on image component 533 which may be separated from main component 537 by FFT circuitry 130 (FIG. 1). In some frequency-domain post distortion embodiments, receiver frequency-domain offset correction circuitry 128 (FIG. 1) may apply the receiver amplitude and phase offsets in the frequency-domain to substantially reduce and/or eliminate image component 533. In some time-domain post distortion embodiments, receiver time-domain offset correction circuitry provided in a signal path before FFT circuitry 130 (FIG. 1) may apply the receiver amplitude and phase offsets in the time-domain to substantially reduce and/or eliminate image component 533.

In some embodiments, receiver calibration signal 535 may be a substantially pure sinusoid without a significant image component. In some embodiments, receiver calibration signal may correspond to receiver calibration signal 135 (FIG. 1) and may be generated by calibration synthesizer 534, which may correspond to calibration synthesizer 134 (FIG. 1), although the scope of the invention is not limited in this respect.

Figure 6:
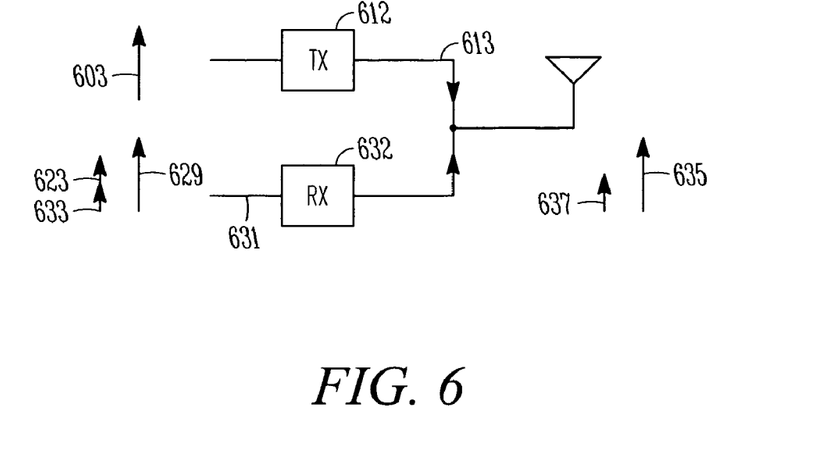
FIG. 6 illustrates a loop-back calibration of a transceiver in accordance with some embodiments of the present invention.

FIG. 6 illustrates a loop-back calibration of a transceiver in accordance with some embodiments of the present invention. In some embodiments, transmitter RF circuitry 612 may correspond to transmitter RF circuitry 112 (FIG. 1), and receiver RF circuitry 632 may correspond to receiver RF circuitry 132 (FIG. 1). As part of the calibration procedure, the output of transmitter RF circuitry 612 may be coupled to an input of receiver RF circuitry 632 (e.g., referred to as loop-back calibration). A transmitter calibration control signal, such as transmitter calibration control signal 133 (FIG. 1), maybe applied to subcarrier modulator 106 (FIG. 1) to cause the subcarrier modulator to generate signal 603 at an input of transmitter RF circuitry 612. RF circuitry 612 may then generate RF output signals 613 having main component 635 as well as image component 637. Image component 637 may substantially be due to phase and/or amplitude mismatches between the I-channel and Q-channel paths of transmitter RF circuitry 612. Receiver RF circuitry 632 may operate on transmitter output signal 613 and may generate receiver output signals 631. Receiver output signals 631 may include main component 629 as well as image components 633 and 623. Image component 633 may result from phase and/or amplitude mismatches in receiver RF circuitry 632 and image component 623 may result from image component 637 which resulted from phase and/or amplitude mismatches of transmitter RF circuitry 612.

In some embodiments, previously generated receiver amplitude and phase offsets may be applied to substantially offset the receiver mismatches (i.e., image component 633) and to isolate the mismatches resulting from transmitter RF circuitry 612. In some embodiments, transmitter amplitude and phase offsets, such as transmitter amplitude and phase offsets 123 (FIG. 1), may be generated to substantially offset the transmitter RF circuitry mismatches (e.g., image component 623). By applying both the receiver and transmitter amplitude and phase offsets, substantially main component 629 of output signal 631 may remain.

Referring back to FIG. 1, in some embodiments, during calibration, output signal 113 of the transmitter RF circuitry 112 may be coupled to an input of receiver RF circuitry 132 prior to calibration circuitry 120 applying transmitter calibration control signal 133 to subcarrier modulator 106. In these embodiments, receiver frequency-domain offset correction circuitry 128 may apply receiver frequency-domain amplitude and phase offsets 121 concurrently with subcarrier modulator 106 generating a calibration signal to allow calibration circuitry 120 to measure the frequency-domain transmitter amplitude and phase mismatches after FFT circuitry 130.

In some embodiments, calibration circuitry 120 may generate receiver amplitude and phase offsets 121 based on measured receiver amplitude and phase mismatches, and calibration circuitry 120 may also generate the transmitter amplitude and phase offsets 123 based on transmitter amplitude and phase mismatches.

In some embodiments, during operation of transceiver 100, transmitter frequency-domain offset correction circuitry 108 may apply transmitter amplitude and phase offsets 123 to transmitter frequency-domain signals 107 in the signal path before IFFT circuitry 110, which may perform an IFFT on the transmitter frequency-domain signals 107. In some embodiments, receiver frequency-domain offset correction circuitry 128 may apply receiver amplitude and phase offsets 121 to receiver frequency-domain signals 129 in the signal path after FFT circuitry 130 performs an FFT on receiver time-domain signals 131 provided by receiver RF circuitry 132.

In some other embodiments, during operation of transceiver 100, transmitter time-domain offset correction circuitry (not separately illustrated) may apply transmitter amplitude and phase offsets to transmitter time-domain signals 111 in the signal path after IFFT circuitry 110. In some other embodiments, receiver time-domain offset correction circuitry (not separately illustrated) may apply the receiver amplitude and phase offsets to receiver time-domain signals 131 in the signal path before FFT circuitry 130 performs an FFT on receiver time-domain signals 131 provided by receiver RF circuitry 132.

In some embodiments, calibration circuitry 120 may apply transmitter calibration control signal 133 to cause subcarrier modulator 106 to responsively generate a substantially pure time-domain digital signal (i.e., with substantially no phase or amplitude offsets, or no image component) which may cause transmitter RF circuitry 112 to generate output RF signal 113, which may have an image component. The image component may be substantially due to mismatches in transmitter RF circuitry 112. In some embodiments, during calibration of transmitter RF circuitry 112, output RF signal 113 may be taken before a power amplifier within transmitter RF circuitry 112 and applied to receiver RF circuitry 132, although the scope of the present invention is not limited in this respect.

In some embodiments, calibration synthesizer 134 may apply receiver calibration signal 135 to an input of receiver RF circuitry 132. In these embodiments, the receiver calibration signal may be applied either prior to or concurrently with calibration circuitry 120 measuring the receiver amplitude and phase mismatches. In some embodiments, receiver calibration signal 135 may comprise a substantially pure single tone sinusoid applied to the input of receiver RF circuitry 134.

In some embodiments, a separate VCO and synthesizer may be used to generate receiver calibration signal 135. In these embodiments, the VCO may be implemented as a ring oscillator since it does not necessarily need to have low phase noise. Any resulting error may be minimized using averaging. Alternatively, tank circuit 208 (FIG. 2) may be reused by reconfiguring it for use with a VCO. In these embodiments, transmitter RF circuitry 112 does not need to be operating during the calibration of receiver RF circuitry 132 allowing for the reuse of tank circuit 208 (FIG. 2).

In other embodiments, a calibration VCO, as part of calibration synthesizer 134, may be used to generate receiver calibration signal 135. The calibration VCO may be a replica of a VCO of transmitter RF circuitry 112 and may generate receiver calibration signal 135 with a frequency offset which, for example, may be caused by a capacitor, although the scope of the invention is not limited in this respect. Tank circuit 208 (FIG. 2) may also be reused in these embodiments.

In some other embodiments, calibration synthesizer 134 may comprise a delay-locked loop (DLL) to generate receiver calibration signal 135 by combining phases of a VCO of transmitter RF circuitry 112 (FIG. 2). Tank circuit 208 (FIG. 2) may also be reused in these embodiments.

In some other embodiments, calibration circuitry 120 may apply calibration control signal 133 to subcarrier modulator 106 which may responsively generate a single tone complex sinusoid calibration signal at a particular one or more of the subcarrier frequencies. One or more VCOs at the output transmitter RF circuitry 112 may be injection locked with an image component of output calibration signal 113 to generate a low-image signal. The injection locking may improve the purity of the output signal by reducing the undesired image tone relative to the desired tone. In some embodiments, an output of a first ring oscillator of the VCO may be used to injection-lock a second ring oscillator, and so on, until the output signal has a desired purity. In some embodiments, an injection-locked oscillator may be used instead of a VCO. In these embodiments, the VCO or the injection-locked oscillator may be provided in place of limiter 136, although the scope of the invention is not limited in this respect.

In accordance with some embodiments that use limiter 136, the determination of the phase and amplitude offset corrections takes advantage of the FFT and IFFT circuitry that is part of a multicarrier transceiver. In these embodiments, FFT circuitry 130 may separate a desired tone at baseband frequency (+fBB) from an undesired image tone at minus baseband frequency (−fBB), as well as separate a non-image tone at three times the baseband frequency (+3fBB) which may have been generated by limiter 136. By determining a constellation point associated with the image tones, calibration circuitry 120 may derive the proper receiver and transmitter amplitude and phase offsets. For example, the received constellation may be normalized so that the symbol at baseband frequency is 1+j0. The symbol at the image frequency in the frequency-domain may be represented as $\Delta A/2 + j\Delta\phi/2$, where $\Delta A$ and $\Delta\phi$ are the amplitude and phase mismatches, respectively, of receiver RF circuitry 132. Based on these receiver amplitude and phase mismatches, calibration circuitry 120 may apply the opposite mismatches (e.g., in the DSP) in the frequency-domain after FFT circuitry 130, which may calibrate receiver RF circuitry 132 in a "one shot" approach. In other embodiments, calibration circuitry 120 may apply the opposite mismatches (e.g., in the DSP) in the time-domain in the signal path before FFT circuitry 130, which may also calibrate receiver RF circuitry 132 in a "one shot" approach. In some embodiments, one or more optimization algorithms, such as steepest descent, may be used to help minimizing the amplitude of the image tones, although the scope of the invention is not limited in this respect.

In some embodiments, the calibration procedure may be repeated two or more times to help improve the accuracy and the results may be averaged. This may reduce inaccuracies caused by quantization errors and phase noise from the VCOs without affecting the image signals that are being measured.

Figure 7:
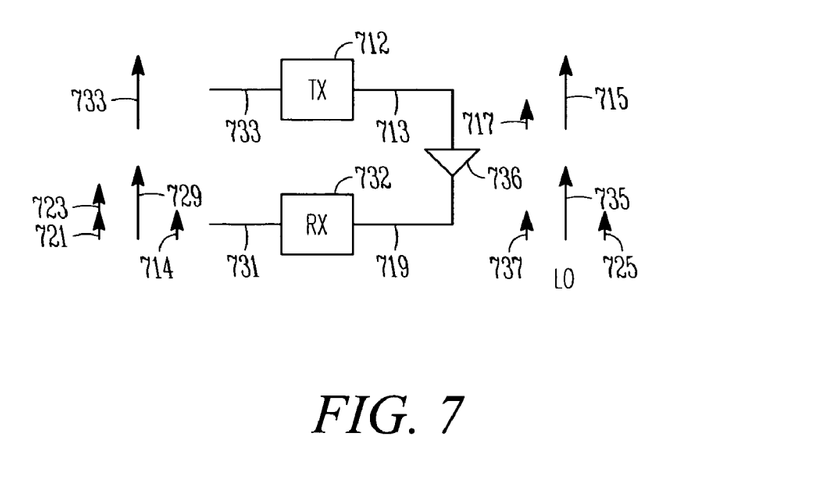
FIG. 7 illustrates calibration of a transceiver in accordance with some other embodiments of the present invention.

FIG. 7 illustrates calibration of a transceiver in accordance with some other embodiments of the present invention. In some embodiments, transmitter RF circuitry 712 may correspond to transmitter RF circuitry 112 (FIG. 1), and receiver RF circuitry 732 may correspond to receiver RF circuitry 132 (FIG. 1). As part of a calibration procedure, the output of transmitter RF circuitry 712 may be coupled to an input of receiver RF circuitry 732 through limiter 736. Limiter 736 may correspond to limiter 136 (FIG. 1).

In these embodiments, the receiver and transmitter RF circuitry may be calibrated together using a single calibration signal. In some embodiments, the receiver and transmitter RF circuitry may be calibrated together in a one-step approach, while in other embodiments, the receiver and transmitter RF circuitry may be calibrated together in a two-step approach. In these embodiments, a single tone calibration signal may be generated by subcarrier modulator 106 (FIG. 1) to provide transmitter/receiver calibration signal 733 at the input of transmitter RF circuitry 712. As a result, transmitter RF circuitry 712 may generate output RF signal 713 having main component 715 and image component 717. Limiter 736 may operate on output RF signal 713 to generate transmitter/receiver calibration signal 719 having main component 735, image component 737 and non-image component 725. In some embodiments, image component 737 may be at minus baseband frequency (−fBB) and non-image component 725 may be at approximately three times the baseband frequency (+3BB). Image component 737 may result from the amplitude an/or phase mismatches of transmitter RF circuitry 712 and may be related to non-image component 725 due to the operation of limiter 736.

Receiver RF circuitry 732 may operate on signal 719 to generate output signal 731, which may comprise main component 729, image components 721 and 723, and non-image component 714. Non-image component 714 and image component 723 may be a result of signal 719 at the input of receiver RF circuitry 732, while image component 721 may result from amplitude and/or phase mismatches in receiver RF circuitry 732. In a one step approach, image component 721, non-image component 714 and image component 723 may be determined. Image component 723 may be used to generate receiver amplitude and phase offsets 121 (FIG. 1), and image component 721 may be used to generate transmitter amplitude and phase offsets 123 (FIG. 1). When the transmitter and receiver amplitude and phase corrections are applied, image components 721 and 723 and non-image component 714 may be reduced substantially to zero leaving substantially main component 729.

In some embodiments, the transmitter amplitude and phase mismatches may be measured based on non-image component 714 by performing the FFT on output signal 731, although the scope of the invention is not limited in this respect. In some embodiments, the receiver amplitude and phase mismatches may be measured by performing the FFT on signal 731 based on image component 721 and non-image component 714. In some embodiments, FFT circuitry 130 (FIG. 1) may separate image components 723 and 721 from non-image component 715 and may also separate main component 729 from the other components for use in determining the amplitude and phase offsets for both the receiver and transmitter RF circuitry in either the one step or two step approaches.

In some embodiments, image component 737 may be related to non-image component 725. In these embodiments, image component 721 after the FFT may be used to determine the image contribution from receiver RF circuitry 732. In this way, the receiver amplitude and phase mismatches may be separated from those due to transmitter RF circuitry 712.

In the two step approach, the transmitter RF circuitry amplitude and phase mismatches (e.g., $\Delta A$ and $\Delta \phi$) may be determined from non-image component 714 and transmitter offsets may be applied to pre-distort the transmitter signals substantially removing non-image component 714 and image component 721 from output signal 731, leaving image component 723. In a second step, image component 723 may be determined and receiver offsets may be applied to post-distort the receiver signals to substantially remove image component 723.

Figure 8:
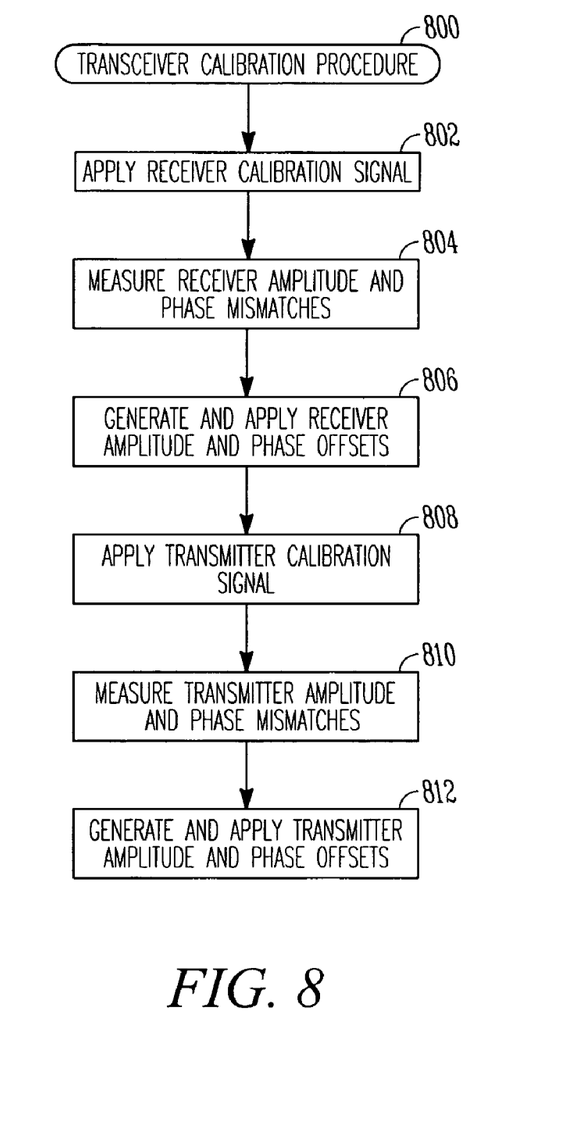
FIG. 8 is a flow chart of a transceiver calibration procedure in accordance with some embodiments of the present invention.

FIG. 8 is a flow chart of a transceiver calibration procedure in accordance with some embodiments of the present invention. Transceiver calibration procedure 800 may be performed by portions of transceiver 100 (FIG. 1), although other transceivers may also be suitable to perform procedure 800. Procedure 800 may be used to determine the amount of pre-distortion to offset amplitude and phase mismatches in transmitter RF circuitry and/or the amount of post distortion to offset amplitude and phase mismatches in receiver RF circuitry. In some embodiments, the pre-distortion may be applied in the frequency-domain in a signal path before the IFFT circuitry of the transmitter, although the scope of the invention is not limited in this respect. In some embodiments, the post distortion may be applied in the frequency-domain in a signal path after the FFT circuitry of the receiver, although the scope of the invention is not limited in this respect. In some embodiments, the pre-distortion may be applied in the time-domain in a signal path after the IFFT circuitry of the transmitter, although the scope of the invention is not limited in this respect. In some embodiments, the post distortion may be applied in the time-domain in a signal path before the FFT circuitry of the receiver, although the scope of the invention is not limited in this respect.

In some embodiments, procedure 800 may be performed during power up of transceiver 100 (FIG. 1), while in other embodiments, procedure 800 may be performed between packets, such as during idle time between packets, although the scope of the invention is not limited in these respect.

Operation 802 may comprise applying a receiver calibration signal, such as calibration signal 135 (FIG. 1) to the input of the receiver RF circuitry. In some embodiments, operation 802 may comprise applying a substantially pure single tone, single frequency analog signal to the input of the receiver RF circuitry.

Operation 804 may comprise measuring receiver amplitude and phase mismatches of the receiver RF circuitry at the FFT output when the receiver calibration signal is applied to the input of the receiver RF circuitry. In some embodiments, FFT circuitry 130 (FIG. 1) may separate any image component from a main component to allow the calibration circuitry to measure the amplitude and phase mismatches in the receiver RF circuitry.

Operation 806 may comprise generating receiver amplitude and phase offsets, such as receiver amplitude and phase offsets 121 (FIG. 1) based on the measured receiver amplitude and phase mismatches in operation 804. In some embodiments, operation 806 may comprise applying the receiver amplitude and phase offsets in the frequency-domain in the signal path after the FFT circuitry to substantially offset the receiver mismatches. In some other embodiments, operation 806 may comprise applying the receiver amplitude and phase offsets in the time-domain in the signal path before the FFT circuitry to substantially offset the receiver mismatches.

Operation 808 may comprise applying a transmitter calibration control signal, such as transmitter calibration control signal 133 (FIG. 1), to a subcarrier modulator, such as subcarrier modulator 106 (FIG. 1), to generate a calibration signal at an input of the transmitter RF circuitry. In some embodiments, prior to applying the transmitter calibration control signal in operation 808, an output of the transmitter RF circuitry may be coupled to an input of receiver RF circuitry by a switching element and/or a power reducing element. In some embodiments, the output of the transmitter RF circuitry may be taken before a power amplifier, although the scope of the invention is not limited in this respect.

Operation 810 may comprise measuring amplitude and phase mismatches of the transmitter RF circuitry by performing an FFT signals at the output of the receiver RF circuitry resulting from the application of the transmitter calibration control signal in operation 808. In some embodiments, applying the receiver amplitude and phase offsets in operation 806 may be performed concurrently with applying the transmitter calibration control signal in operation 808 to isolate and measure the transmitter amplitude and phase mismatches in operation 810. In some embodiments, FFT circuitry 130 (FIG. 1) may separate an image component from a main component to allow the calibration circuitry to measure and amplitude and/or phase mismatches of the transmitter RF circuitry, although the scope of the present invention is not limited in this respect.

Operation 812 may comprise generating transmitter amplitude and phase offsets, such as transmitter amplitude and phase offsets 123 (FIG. 1) based on the transmitter amplitude and phase mismatches measured in operation 810. In some embodiments, the transmitter amplitude and phase offsets may be applied in the frequency-domain to frequency-domain signals in the signal path before performing an IFFT on the transmitter signals, although the scope of the present invention is not limited in this respect. In some embodiments, the receiver amplitude and phase offsets generated in operation 806 may be applied in the frequency-domain to receiver frequency-domain signals in the signal path after performing an FFT on receiver signals provided by the receiver RF circuitry, although the scope of the present invention is not limited in this respect. In some other embodiments, the transmitter amplitude and phase offsets may be applied in the time-domain to transmit time-domain signals in the signal path after performing an IFFT on transmitter signals, although the scope of the present invention is not limited in this respect. In some embodiments, the receiver amplitude and phase offsets generated in operation 806 may be applied in the time-domain to receiver time-domain signals in the signal path before performing an FFT on receiver signals provided by the receiver RF circuitry, although the scope of the present invention is not limited in this respect.

In some embodiments, applying the transmitter calibration control signal in operation 808 may comprise subcarrier modulator 106 (FIG. 1) responsively generating a substantially pure time-domain digital signal to provide an input signal to transmitter RF circuitry 112 (e.g., with substantially no phase or amplitude offsets, or matched I and Q components) to allow the transmitter RF circuitry to generate output RF signal 113.

In some embodiments, procedure 800 may also include coupling a limiter between an output of the transmitter RF circuitry and an input of the receiver RF circuitry to generate a calibration signal based on an output RF signal. The calibration signal may have a non-image component and an image component and may be applied to the input of the receiver RF circuitry. In these embodiments, both transmitter amplitude and phase mismatches may be measured together by performing the FFT on signals at the output of the receiver RF circuitry based on the non-image component.

In some embodiments, procedure 800 may also include coupling one or more VCOs between an output of the transmitter RF circuitry and an input of the receiver RF circuitry. In these embodiments, the one or more VCOs may be injection locked as discussed above.

In some embodiments, at least some operations of procedure 800 may be performed on a regular basis, such as during idle times between packets. In some embodiments, at least some operations of procedure 800 may be performed at power up of the transceiver. In some embodiments, procedure 800 may apply amplitude and phase offsets in the time-domain. In some embodiments, procedure 800 may apply amplitude and phase offsets in the frequency-domain for one or more subcarriers of a multicarrier communication channel. In some embodiments, a representative subcarrier may be chosen to calculate the mismatches; however corrections may be applied to all subcarriers in the time-domain.

Although the individual operations of procedure 800 are illustrated and described as separate operations, one or more of the individual operations may be performed concurrently, and nothing requires that the operations be performed in the order illustrated.

Embodiments of the invention may be implemented in one or a combination of hardware, firmware and software. Embodiments of the invention may also be implemented as instructions stored on a machine-readable medium, which may be read and executed by at least one processor to perform the operations described herein. A machine-readable medium may include any mechanism for storing or transmitting information in a form readable by a machine (e.g., a computer). For example, a machine-readable medium may include read-only memory (ROM), random-access memory (RAM), magnetic disk storage media, optical storage media, flash-memory devices, electrical, optical, acoustical or other form of propagated signals (e.g., carrier waves, infrared signals, digital signals, etc.), and others.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, invention lies in less than all features of a single disclosed embodiment. Thus the following claims are hereby incorporated into the detailed description, with each claim standing on its own as a separate preferred embodiment.

What is claimed is:

1. A method of reducing offsets of a transceiver comprising:
   measuring receiver amplitude and phase mismatches of receiver radio-frequency (RF) circuitry by performing a fast Fourier transform (FFT) on a receiver calibration signal;
   applying receiver amplitude and phase offsets to substantially offset the receiver mismatches;
   applying a transmitter calibration signal;
   measuring transmitter amplitude and phase mismatches of transmitter RF circuitry by performing an FFT on the transmitter calibration signal; and
   coupling a limiter between an output of the transmitter RF circuitry and an input of receiver RF circuitry, the limiter to generate a receiver-transmitter calibration signal based on an output RF signal of the transmitter RF circuitry, the receiver-transmitter calibration signal having a non-image component, an image component and a main component,
   wherein the transmitter amplitude and phase mismatches are measured by performing the FFT on the receiver-transmitter calibration signal based on the non-image component, the FFT to separate the image component, the non-image component and the main component.

2. The method of claim 1 further comprising prior to applying the transmitter calibration signal, coupling the output of transmitter RF circuitry to the input of the receiver RF circuitry, and
   wherein the applying the receiver amplitude and phase offsets is performed concurrently with the applying the transmitter calibration signal to measure the transmitter amplitude and phase mismatches.

3. The method of claim 2 wherein the image component of the receiver calibration signal is measured after performing the FFT on the receiver calibration signal at an output of the receiver RF circuitry, and wherein the image component of the transmitter calibration signal is measured after performing an FFT on the transmitter calibration signal at the output of the receiver RF circuitry, and wherein the image component of the receiver calibration signal results from mismatches in the receiver RF circuitry and the image component of the transmitter calibration signal results from mismatches of the transmitter RF circuitry.

4. The method of claim 3 further comprising:

generating the receiver amplitude and phase offsets based on the measured receiver amplitude and phase mismatches; and generating transmitter amplitude and phase offsets based on the transmitter amplitude and phase mismatches.

5. The method of claim 4 wherein the transmitter amplitude and phase offsets are applied to transmit frequency-domain signals in a signal path before performing an inverse FFT (IFFT) on transmitter signals provided to the transmitter RF circuitry, and wherein the receiver amplitude and phase offsets are applied to receiver frequency-domain signals in a signal path after performing an FFT on signals provided by the receiver RF circuitry.

6. The method of claim 4 wherein the transmitter amplitude and phase offsets are applied to transmit time-domain signals in a signal path after performing an inverse FFT (IFFT) on transmiller signals provided to the transmitter RF circuitry, and wherein the receiver amplitude and phase offsets are applied to receiver time-domain signals in a signal path before performing an FFT on signals provided by the receiver RF circuitry.

7. The method of claim 1 further comprising:

generating the transmitter amplitude and phase offsets based on the non-image component;

applying the transmitter amplitude and phase offsets to substantially reduce the non-image component and an image component due to the transmitter RF circuitry; and determining the receiver amplitude and phase offsets while applying the transmitter amplitude and phase offsets.

8. The method of claim 1 further comprising applying the receiver calibration signal to the input of receiver RF circuitry, and wherein the receiver calibration signal is applied either prior to or concurrently with the measuring the receiver amplitude and phase mismatches.

9. The method of claim 8 wherein applying the receiver calibration signal comprises applying a substantially pure single tone sinusoid radio frequency (RF) receiver calibration signal to the input of the receiver RF circuitry.

10. The method of claim 9 wherein the receiver calibration signal is generated by calibration voltage controlled oscillator and synthesizer circuitry.

11. The method of claim 9 wherein the receiver calibration signal is generated by a replica of a voltage controlled oscillator of the transmitter RF circuitry with a frequency offset.

12. The method of claim 9 wherein the receiver calibration signal is generated by a delay-locked loop combining phases of a voltage controlled oscillator of the transmitter RF circuitry.

13. A method of reducing offsets of a transceiver comprising:

measuring receiver amplitude and phase mismatches of receiver radio-frequency (RF) circuitry by performing a fast Fourier transform (FFT) on a receiver calibration signal;

applying receiver amplitude and phase offsets to substantially offset the receiver mismatches;

applying a transmitter calibration signal;

measuring transmitter amplitude and phase mismatches of transmitter RF circuitry by performing an FFT on the transmitter calibration signal; and applying the transmitter calibration signal comprising a single tone complex sinusoid generated by a subcarrier modulator, and wherein the method further comprises injection locking a voltage controlled oscillator at an output of the transmitter RF circuitry with the transmitter calibration signal to generate a low-image signal at the output of the transmitter RF circuitry.

14. A method of reducing offsets of a transceiver comprising:

measuring receiver amplitude and phase mismatches of receiver radio-frequency (RF) circuitry by performing a fast Fourier transform (FFT) on a receiver calibration signal;

applying receiver amplitude and phase offsets to substantially offset the receiver mismatches;

applying a transmitter calibration signal;

measuring transmitter amplitude and phase mismatches of transmitter RF circuitry by performing an FFT on the transmitter calibration signal; and prior to applying the transmitter calibration signal, coupling an output of transmitter RF circuitry to an input of the receiver RF circuitry, wherein the applying the receiver amplitude and phase offsets is performed concurrently with the applying the transmitter calibration signal to measure the transmitter amplitude and phase mismatches, wherein measuring the receiver amplitude and phase mismatches comprises measuring an image component of the receiver calibration signal produced by the receiver RF circuitry after performing an FFT on the receiver calibration signal at an output of the receiver RF circuitry, wherein measuring the transmitter amplitude and phase mismatches comprises measuring an image component of the transmitter calibration signal produced by the transmitter RF circuitry after performing an FFT on the transmitter calibration signal at the output of the receiver RF circuitry, wherein the method is performed by a first communication station, and wherein after generating both the transmitter and receiver amplitude and phase offsets, the method further comprises:

applying the transmitter amplitude and phase offsets to a transmit signal comprising transmit frequency-domain signals before performing an IFFT on the transmit frequency-domain signals;

RF modulating and transmitting the transmit signal to a second communication station;

receiving and RF demodulating a received signal received from the second communication station; and applying the receiver amplitude and phase offsets to receive frequency-domain signals comprising the received signal after performing an FFT on the received signal.

15. The method of claim 1 wherein the transceiver is a multicarrier transceiver which communicates a multicarrier signal comprising a plurality of symbol-modulated subcarriers, and
wherein the measuring the receiver mismatches, the applying the receiver offsets, the applying the transmitter calibration signal, and the measuring the transmitter mismatches are performed for subcarriers of the plurality.

16. A transceiver comprising:
calibration circuitry to measure receiver amplitude and phase mismatches of receiver RF circuitry from a fast Fourier transform (FFT) on a receiver calibration signal; and
receiver offset correction circuitry to apply receiver amplitude and phase offsets to substantially offset the receiver mismatches,
wherein the calibration circuitry measures transmitter amplitude and phase mismatches of transmiller RF circuitry from an FFT on a transmiller calibration signal,
wherein the transceiver further comprises inverse FFT (IFFT) circuitry, FFT circuitry, and a limiter coupled between an output of the transmitter RF circuitry and an input of the receiver RF circuitry, the limiter to generate a receiver-transmitter calibration signal based on an output RF signal of the transmitter RF circuitry, the receiver-transmitter calibration signal having a non-image component, an image component and a main component, and
wherein the calibration circuitry measures the transmitter amplitude and phase mismatches based on the non-image component after the FFT circuitry performs the FFT on the receiver-transmitter calibration signal to separate the image, non-image and main components.

17. The transceiver of claim 16 wherein the output of the transmitter RF circuitry is coupled to the input of the receiver RF circuitry prior to applying the transmitter calibration signal, and
wherein the receiver offset correction circuitry applies the receiver amplitude and phase offsets concurrently with the transmitter calibration signal to allow the calibration circuitry to measure the transmitter amplitude and phase mismatches.

18. The transceiver of claim 17 wherein the image component is measured after the FFT circuitry performs an FFT on the receiver calibration signal at an output of the receiver RF circuitry, and
wherein the image component of the transmitter calibration signal is measured after the FFT circuitry performs an FFT on the transmitter calibration signal at the output of the receiver RF circuitry, and
wherein the image component of the receiver calibration signal results from mismatches in the receiver RF circuitry and the image component of the transmitter calibration signal results from mismatches of the transmitter RF circuitry.

19. The transceiver of claim 18 wherein the calibration circuitry generates the receiver amplitude and phase offsets based on the measured receiver amplitude and phase mismatches, and
the calibration circuitry generates the transmitter amplitude and phase offsets based on the transmitter amplitude and phase mismatches.

20. The transceiver of claim 19 wherein the transmitter offset correction circuitry applies the transmitter amplitude and phase offsets to transmitter frequency-domain signals in a signal path before the IFFT circuitry performs an IFFT on transmit signals, and
wherein the receiver offset correction circuitry applies the receiver amplitude and phase offsets to receiver frequency-domain signals in a signal path after the FFT circuitry performs an FFT on signals from the receiver RF circuitry.

21. The transceiver of claim 19 wherein the transmitter offset correction circuitry applies the transmitter amplitude and phase offsets to transmitter time-domain signals in a signal path after the IFFT circuitry performs an IFFT on the transmitter signals, and
wherein the receiver offset correction circuitry applies the receiver amplitude and phase offsets to receiver time-domain signals in a signal path before the FFT circuitry performs an FFT on signals from the receiver RF circuitry.

22. The transceiver of claim 16 wherein the calibration circuitry generates the transmitter amplitude and phase offsets based on the non-image component,
wherein the transmitter offset correction circuitry applies the transmitter amplitude and phase offsets to substantially reduce the non-image component and an image component due to the transmitter RF circuitry, and
wherein the calibration circuitry determines the receiver amplitude and phase offsets while applying the transmitter amplitude and phase offsets.

23. The transceiver of claim 16 wherein a calibration synthesizer applies the receiver calibration signal to the input of the receiver RF circuitry, and
wherein the receive calibration signal is applied either prior to or concurrently with the calibration circuitry to measure the receiver amplitude and phase mismatches.

24. The transceiver of claim 23 wherein the receiver calibration signal comprises a substantially pure single tone sinusoid radio frequency (RF) receiver calibration signal.

25. The transceiver of claim 24 further comprising a calibration voltage controlled oscillator and synthesizer circuitry to generate the receiver calibration signal.

26. The transceiver of claim 24 further comprising a voltage controlled oscillator to generate the receiver calibration signal, the voltage controlled oscillator being a replica of a voltage controlled oscillator of the transmitter RF circuitry to generate the receiver calibration signal with a frequency offset.

27. The transceiver of claim 24 further comprising a delay-locked loop to generate the receiver calibration signal by combining phases a voltage controlled oscillator of the transmitter RF circuitry.

28. A transceiver comprising:
calibration circuitry to measure receiver amplitude and phase mismatches of receiver RF circuitry from a fast Fourier transform (FFT) on a receiver calibration signal; and
receiver offset correction circuitry to apply receiver amplitude and phase offsets to substantially offset the receiver mismatches, wherein the calibration circuitry measures transmitter amplitude and phase mismatches of transmitter RF circuitry from an FFT on a transmitter calibration signal, wherein a calibration synthesizer applies the receiver calibration signal to an input of the receiver RF circuitry, wherein the receive calibration signal is applied either prior to or concurrently with the calibration circuitry to measure the receiver amplitude and phase mismatches, wherein the transmitter calibration signal comprises a single tone complex sinusoid generated by a subcarrier modulator, and wherein a voltage controlled oscillator is injection locked with signals at an output of the transmitter RF circuitry generated by the transmitter RF circuitry in response to the transmitter calibration signal, the voltage controlled oscillator to generate a low-image signal at the output of the transmitter RF circuitry.

29. A transceiver comprising:

calibration circuitry to measure receiver amplitude and phase mismatches of receiver RF circuitry from a fast Fourier transform (FFT) on a receiver calibration signal; and receiver offset correction circuitry to apply receiver amplitude and phase offsets to substantially offset the receiver mismatches, wherein the calibration circuitry measures transmitter amplitude and phase mismatches of transmitter RF circuitry from an FFT on a transmitter calibration signal, wherein the transmitter and receiver RF circuitry communicate multicarrier signals comprising a plurality of symbol-modulated subcarriers, and wherein the calibration circuitry measures the receiver and transmitter mismatches for at least one subcarrier of the plurality, and wherein the transmitter offset correction circuitry applies transmitter offsets and the receiver offset correction circuitry applies receiver offsets for the subcarriers of the plurality.

30. A system comprising:

a substantially onmidirectional antenna;

a transceiver to communicate signals with the antenna, the transceiver comprising:

calibration circuitry to measure receiver amplitude and phase mismatches of receiver radio-frequency (RF) circuitry from a fast Fourier transform (FFT) on a receiver calibration signal; and receiver offset correction circuitry to apply receiver amplitude and phase offsets to substantially offset the receiver mismatches, wherein the calibration circuitry measures transmitter amplitude and phase mismatches of transmiller RF circuitry from an FFT on a transmiller calibration signal, wherein the transceiver further comprises inverse FFT (IFFT) circuitry, FFT circuitry, and a limiter coupled between an output of the transmitter RF circuitry and an input of the receiver RF circuitry, the limiter to generate a receiver-transmitter calibration signal based on an output RF signal of the transmitter RF circuitry, the receiver-transmitter calibration signal having a non-image component, an image component and a main component, and wherein the calibration circuitry measures the transmitter amplitude and phase mismatches based on the non-image component after the FFT circuitry performs the FFT on the receiver-transmitter calibration signal to separate the image, non-image and main components.

* * * * *

UNITED STATES PATENT AND TRADEMARK OFFICE
CERTIFICATE OF CORRECTION

PATENT NO. : 7,333,423 B2 Page 1 of 1
APPLICATION NO. : 10/815138
DATED : February 19, 2008
INVENTOR(S) : Palaskas et al.

It is certified that error appears in the above-identified patent and that said Letters Patent is hereby corrected as shown below:

In column 17, line 33, in Claim 6, delete "transmiller" and insert -- transmitter --, therefor.

In column 19, line 26, in Claim 16, delete "transmiller" and insert -- transmitter --, therefor.

In column 19, line 27, in Claim 16, delete "transmiller" and insert -- transmitter --, therefor.

In column 20, line 41, in Claim 23, delete "receive" and insert -- receiver --, therefor.

In column 21, line 8, in Claim 28, delete "receive" and insert -- receiver --, therefor.

In column 22, line 6, in Claim 30, delete "onmidirectional" and insert -- omnidirectional --, therefor.

In column 22, line 18, in Claim 30, delete "transmiller" and insert -- transmitter --, therefor.

In column 22, line 19, in Claim 30, delete "transmiller" and insert -- transmitter --, therefor.

Signed and Sealed this

Eighth Day of July, 2008

JON W. DUDAS
*Director of the United States Patent and Trademark Office*